Patented Feb. 5, 1929.

1,701,200

UNITED STATES PATENT OFFICE.

RICHARD WILLSTÄTTER, OF MUNICH, GERMANY, AND HARRY SOBOTKA, OF NEW YORK, N. Y.

YEAST PREPARATION AND PROCESS OF MANUFACTURING THE SAME.

No Drawing. Application filed June 19, 1926. Serial No. 117,145.

Our invention relates to a yeast preparation, particularly suitable for bakers' and brewers' use, and to a process of manufacturing such preparation.

Letters Patent 1,538,366, granted to us May 19th, 1925, discloses a method in which, by addition of sugar to yeast, the plasmolysis of yeast may be controlled so as to yield a honey-like product containing vitamines, enzymes and other physiologically active substances of the yeast-cell in a highly protected state, together with flavoring compounds formed by the mild reaction between carbohydrates and nitrogenous degradation products of yeast. By experiments recently conducted by us on rats, it was found that a certain amount of such a product contains a markedly higher amount of vitamin B units than might be anticipated from the amount of yeast used in its preparation.

Furthermore, Letters Patent 1,574,776 granted to us March 2nd, 1926, discloses that sucrose may be replaced entirely or partially by malt extract or maltose in any other form or some other disaccharide.

According to our present invention, instead of using the disaccharides, sucrose, maltose or lactose, we use the monosaccharides, glucose (dextrose) or glucose syrup in any available form such as starch syrup from corn, potatoes etc., fructose or invert sugar.

While the use of pure crystalline anhydrous glucose does not seem to be favorable for rapid liquefaction of the mass when using highly pressed yeast, the addition of a small quantity of water or the use of yeast containing more than 75% water or the use of glucose syrup will serve the purpose of liquefaction. The liquefaction may be in-initiated with glucose syrup and quantities of crystalline glucose may successively be added.

For instance, 100 kilograms of washed and pressed yeast are mixed with at least 50 kg. corn-syrup. The mass is heated to 40–60° C. After the liquefaction has taken place 100–150 kg. syrup or crystalline glucose are added. The resulting mass is heated carefully in a kneading mill to 85–110° C., as described in the patents above mentioned according to the taste and concentration required for the special purpose.

The product will exhibit properties similar to those of the product manufactured according to Patent 1,574,776 and, because of its lower price and its less pronounced sweetness, it will advantageously be used for baking purposes and for all kinds of candy and confectionery in which starch syrup is a usual ingredient and constituent.

The quantitative proportions are based on the same principles as in the foregoing patents; in order to avoid fermentation the amount of carbohydrate must exceed one tenth of the entire mixture.

Mixtures of the various carbohydrates above referred to may also be used both for the sake of convenience in the process of manufacture and for the regulation of the taste. In such cases it will be practical to initiate liquefaction by means of crystalline sucrose or fructose and to add the other constituent or constituents during the first period of heating. Lactose, for instance, might be used in the form of a concentrate of whey, invert-sugar in the form used by candy-factories and prepared from sucrose by acidic or enzymatic hydrolysis.

For example 100 kg. yeast are mixed with 50 kg. finely powdered saccharose and heated to 40–50° C. After complete liquefaction 100 kg. malt extract and 50 kg. lactose syrup, both containing less than 20% water, are added and the temperature is raised slowly to 85–100° C.

What we claim is:—

1. The herein described process of manufacturing a yeast preparation, which consists in initiating autolysis and liquefaction of a mass of yeast, and thereupon adding to the liquefied mass a saccharide incapable of such initiation.

2. The herein described process of manufacturing a yeast preparation, which consists in initiating autolysis and liquefaction of a mass of yeast, and thereupon adding to the liquefied mass a saccharide incapable of such initiation, the latter being added in a quantity at least equal to that of the yeast mass employed.

3. The herein described process of manufacturing a yeast preparation, which consists in initiating autolysis and liquefaction of a mass of yeast, and thereupon adding to the liquefied mass a monosaccharide.

4. The herein described process of manufacturing a yeast preparation, which consists in initiating autolysis and liquefaction of a mass of yeast, and thereupon adding glucose to the liquefied mass.

5. The herein described process of manufacturing a yeast preparation, which consists in initiating autolysis and liquefaction of a mass of yeast, said initiation including the addition of a saccharide to the yeast, and thereupon adding to the liquefied mass a monosaccharide in a quantity at least twice that of the first-mentioned saccharide.

6. The herein described process of manufacturing a yeast preparation, which consists in initiating autolysis and liquefaction of a mass of yeast, said initiation including the addition of a relatively small amount of diaccharide to the yeast, and thereupon adding to the liquefied mass a relatively large amount of monosaccharide.

7. The herein described process of manufacturing a yeast preparation, which consists in initiating autolysis and liquefaction of a mass of yeast, said initiation including the addition of a saccharide to the yeast in the approximate proportion of two parts of yeast to one part of saccharide, and thereupon adding to the liquefied mass a monosaccharide in a quantity at least twice that of the first-mentioned saccharide.

8. The herein described process of manufacturing a yeast preparation, which consists in initiating autolysis and liquefaction of a mass of yeast, heating the liquefied mass to about 40-50 degrees C., then adding to the liquefied mass an approximately equal amount of saccharide which would have been incapable of initiating said autolysis, and heating the mass to about 85-100 degrees C.

9. The herein described process of manufacturing a yeast preparation, which consists in initiating autolysis and liquefaction of a mass of yeast, heating the liquefied mass to about 40-50 degrees C., then adding to the liquefied mass an approximately equal amount of a monosaccharide, and heating the mass to about 85-100 degrees C.

10. An article of manufacturing for use as a baking or brewing preparation, comprising a mass of unfermented yeast, and at least one third of its weight in glucose mixed therewith.

11. A yeast preparation consisting of yeast, a relatively small amount of saccharide capable of initiating autolysis of the yeast and mixed therewith in a proportion which produces liquefaction but not fermentation, and a relatively large amount of a saccharide which is incapable of such initiation.

In testimony whereof we affix our signatures.

RICHARD WILLSTÄTTER.
HARRY SOBOTKA.